US010878437B2

(12) United States Patent
Ye et al.

(10) Patent No.: US 10,878,437 B2
(45) Date of Patent: Dec. 29, 2020

(54) INFORMATION SHARING METHOD, CLIENT, AND COMPUTER STORAGE MEDIUM

(71) Applicant: Tencent Technology (Shenzhen) Company Limited, Shenzhen (CN)

(72) Inventors: Wa Ye, Shenzhen (CN); Zhenyu Xu, Shenzhen (CN); Peiku Li, Shenzhen (CN); Zhouwei Zhu, Shenzhen (CN); Mengsha Zhou, Shenzhen (CN); Jiongchao Lin, Shenzhen (CN); Beiqi Wu, Shenzhen (CN); Likai Wang, Shenzhen (CN); Jiandong Lin, Shenzhen (CN); Dacheng Zhuo, Shenzhen (CN); Zeqi Lian, Shenzhen (CN); Hongyang Wang, Shenzhen (CN); Jing Zang, Shenzhen (CN)

(73) Assignees: TENCENT TECHNOLOGY (SHENZHEN), Shenzhen (CN); COMPANY LIMITED, Shenzhen (CN)

( * ) Notice: Subject to any disclaimer, the term of this patent is extended or adjusted under 35 U.S.C. 154(b) by 260 days.

(21) Appl. No.: 15/725,127

(22) Filed: Oct. 4, 2017

(65) Prior Publication Data

US 2018/0033034 A1    Feb. 1, 2018

Related U.S. Application Data

(63) Continuation-in-part of application No. PCT/CN2016/084581, filed on Jun. 2, 2016.

(30) Foreign Application Priority Data

Sep. 30, 2015    (CN) .......................... 2015 1 0644134

(51) Int. Cl.
*G06Q 30/02*     (2012.01)
*G06F 3/0482*    (2013.01)
*G06Q 50/00*     (2012.01)

(52) U.S. Cl.
CPC ....... *G06Q 30/0214* (2013.01); *G06F 3/0482* (2013.01); *G06Q 30/0225* (2013.01); *G06Q 50/01* (2013.01)

(58) Field of Classification Search
USPC ........................................... 705/14.16, 14.26
See application file for complete search history.

(56) References Cited

U.S. PATENT DOCUMENTS 9,015,589 B2 *   4/2015   Alhadeff ................ G06Q 30/02
                                                           705/14.1
2012/0209686 A1 *  8/2012  Horowitz ................ H04W 4/21
                                                          705/14.26

(Continued)

FOREIGN PATENT DOCUMENTS

CN    102034177 A    4/2011
CN    102576445 A    7/2012

(Continued)

OTHER PUBLICATIONS

Tencent Technology, ISRWO, PCT/CN2016/095692, Jul. 26, 2016, 9 pgs.
Tencent Technology, IPRP, PCT/CN2016/095692, Apr. 3, 2018, 8 pgs.

*Primary Examiner* — Afaf Osman Bilal Ahmed
(74) *Attorney, Agent, or Firm* — Morgan, Lewis & Bockius LLP

(57) ABSTRACT

An information sharing method, including; receiving an instruction for sharing first information to a first information pool of a first user, wherein the first information pool includes a plurality of electronic coupons shared by one or more contact users associated with the first user, and wherein the first information pool is accessible to respective user accounts of the one or more contact users; adding the first electronic coupon to the first information pool; receiving a confirmation notification from a third-party server corre- (Continued)

sponding to the first electronic coupon, wherein the confirmation notification is sent by the third-party server in response to a second user in the contact users applying the first electronic coupon in an online transaction, wherein the confirmation notification includes at least second information that corresponds to the first information, wherein the second information includes a second electronic coupon related to the first electronic coupon.

8 Claims, 9 Drawing Sheets

(56) References Cited

U.S. PATENT DOCUMENTS

| | | | |
|---|---|---|---|
| 2012/0316938 A1* | 12/2012 | Moshfeghi | G06Q 30/02 705/14.16 |
| 2013/0006738 A1* | 1/2013 | Horvitz | G06Q 30/0207 705/14.16 |

FOREIGN PATENT DOCUMENTS

| | | |
|---|---|---|
| CN | 103177370 A | 6/2013 |
| CN | 103348368 A | 10/2013 |
| CN | 103366291 A | 10/2013 |
| CN | 103635923 A | 3/2014 |
| CN | 104618226 A | 5/2015 |
| CN | 105338066 A | 2/2016 |

* cited by examiner

INFORMATION SHARING METHOD, CLIENT, AND COMPUTER STORAGE MEDIUM

PRIORITY CLAIM AND RELATED APPLICATION

This application is a continuation-in-part application of PCT/CN2016/084581, entitled "INFORMATION SHARING METHOD, CLIENT, AND COMPUTER STORAGE MEDIUM" filed on Jun. 2, 2016, which claims priority to Chinese Patent Application No. 201510644134.1, filed with the State Intellectual Property Office of the People's Republic of China on Sep. 30, 2015, and entitled "INFORMATION SHARING METHOD, CLIENT, AND COMPUTER STORAGE MEDIUM", both of which are incorporated herein by reference in their entirety.

FIELD OF THE TECHNOLOGY

The present disclosure relates to information sharing technologies, and in particular, to an information sharing method, a client, and a computer storage medium.

BACKGROUND OF THE DISCLOSURE

With the development of Internet, diversified network products have been developed. Currently, electronic tickets such as e-tickets or e-coupons are used by more and more users because of convenience. In promotion activities, merchants usually issue some coupons in an electronic form on the Internet. The users may download the coupons and use the electronic coupons when purchasing goods online or at physical stores.

SUMMARY

The development of the Internet also allows users to communicate in more manners. For example, the users may chat with each other or send files to each other by means of instant messaging applications. Based on this, the users expect to share coupons with friends by means of Internet communication. Currently, the coupons only can be shared in a one-to-one manner, that is, the users only can send the coupons to specific friends. The spreading efficiency of the coupons is very low. Therefore, the use efficiency of the coupons is also very low.

To resolve the foregoing technical problems, embodiments of the present technology provide an information sharing method, a client, and a computer storage medium.

An information sharing method provided in an embodiment of the present technology includes:

obtaining first information, and sharing the first information to an information pool of a first user, so that contact users associated with the first user can view the first information in the information pool;

receiving, after a second user in the contact users processes first data by using the first information, N pieces of second information that are corresponding to the first information and that are sent by a server, $N \geq 1$; and sharing the N pieces of second information to an information pool of the second user, so that contact users associated with the second user can view the N pieces of second information in the information pool.

A client provided in an embodiment of the present technology includes:

an obtaining unit, configured to obtain first information;

a sharing unit, configured to share the first information to an information pool of a first user, so that contact users associated with the first user can view the first information in the information pool; and a first receiving unit, configured to receive, after a second user in the contact users processes first data by using the first information, N pieces of second information that are corresponding to the first information and that are sent by a server, $N \geq 1$, the sharing unit being further configured to share the N pieces of second information to an information pool of the second user, so that contact users associated with the second user can view the N pieces of second information in the information pool.

A computer storage medium provided in an embodiment of the present technology stores a computer program, and the computer program is used for performing the foregoing information sharing method.

DESCRIPTION OF EMBODIMENTS

To better understand features and technical content of embodiments of the present technology in detail, implementations of the embodiments of the present technology are described in detail below with reference to the accompanying drawings. The accompanying drawings are merely for reference and description, and are not intended to limit the embodiments of the present technology.

Figure 1:
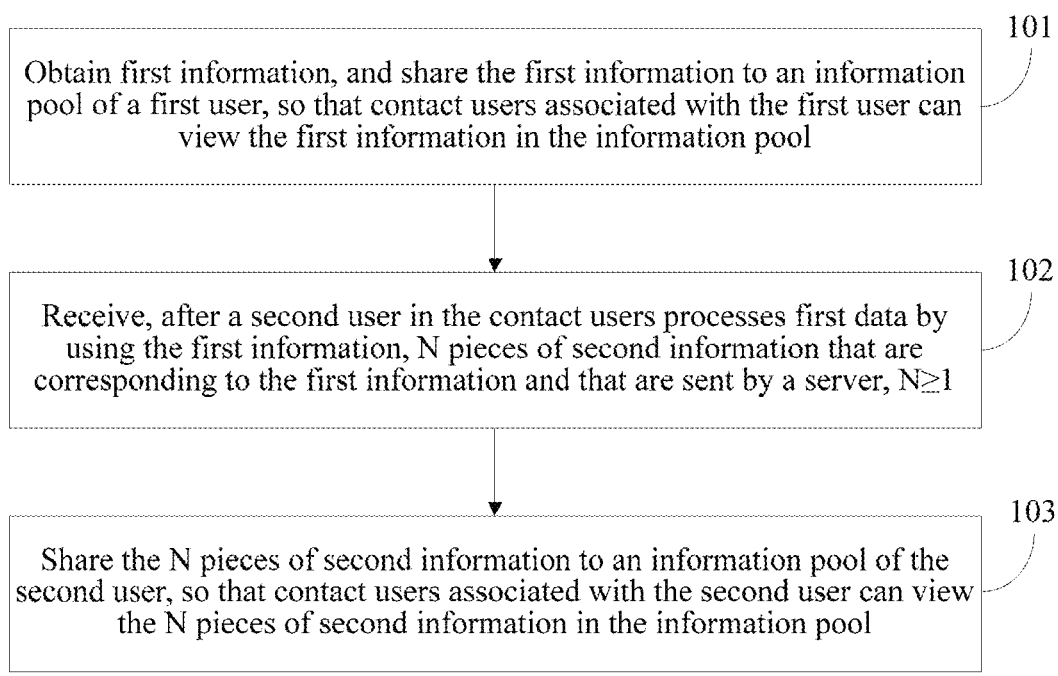
FIG. 1 is a schematic flowchart of an information sharing method according to some embodiments of the present technology.

FIG. 1 is a schematic flowchart of an information sharing method according to Embodiment 1 of the present technology. The information sharing method in this embodiment of the present technology is applied to a client device. As shown in FIG. 1, the information sharing method includes the following operations:

Operation S101: Obtain first information, and share the first information to an information pool of a first user, so that contact users associated with the first user can view the first information in the information pool.

In this embodiment of the present technology, the first information especially refers to an electronic ticket or coupon. In this embodiment of the present technology, the first information is also referred to as an electronic card or coupon. The card is issued by a merchant on a card issue platform. The card issue platform herein is implemented by a server. The merchant may set a card collection condition. A user may collect the card after meeting the collection condition.

In this embodiment of the present technology, after obtaining the first information, the first user shares the first information to the information pool of the first user (e.g., a shared coupon pool). The information pool of the first user herein stores multiple pieces of information, and each piece of information corresponds to a card. That is, the information pool of the first user stores cards of the first user, and optionally cards of other users that have elected to share the cards with the other users connected to the pool. Particularly, the information in the information pool of the first user can be viewed not only by the first user, but also by the contact users associated with the first user. Therefore, the information pool of the first user is a shared information pool. During specific implementation, the information pool may be named "Offers from Friends", or may be named other names certainly.

In this embodiment of the present technology, the information pool may be implemented by combining an existing social network application. For example, WeChat has a coupon organizer or electronic wallet function of "Cards & Offers", multiple cards are stored in the "Cards & Offers", the "Cards & Offers" may be named the "Offers from Friends", and all the cards in the "Cards & Offers" may be viewed by all the contact users of the first user. In some embodiments, the user also has a private card folder that includes electronic cards and coupons that the user has not shared with others. In some embodiments, the user may set up multiple shared card folders (or shared information pools), each for a different group of social network contacts, and optionally, each for a different type of goods and services. In some embodiments, the cards in the first information pool are organizable by users and/or by types of goods and services. In some embodiments, the client terminal automatically search and identify relevant electronic coupons based on the transaction that the user is currently carrying out using the first application. In some embodiments, the coupons can be applied to transactions that occur at a physical store or establishment. In some embodiments, the client device scans a barcode and/or a location of the store or establishment using a scanning device of the client device, and automatically identifies the electronic coupon(s) in the shared coupon pool that can be applied at the store or establishment, and presents the coupon(s) to the user.

Operation S102: Receive, after a second user in the contact users processes first data by using the first information, N pieces of second information that are corresponding to the first information and that are sent by a server, N≥1.

The second user herein is different from the first user. The second user is one of the contacts of the first user. The contacts herein are also referred to as friends. That a second user processes first data by using the first information means that the second user uses the first information to pay for a target object to be paid. It can be seen that the first data is the target object to be paid. After the second user processes the first data by using the first information, the first information is redeemed. Being redeemed means that the first information is used. The used first information does not have a use function any more, that is, the user cannot process data again by using the used first information.

In this embodiment of the present technology, the server refers to a card distribution platform. After the second user processes the first data by using the first information, the second user receives the N pieces of second information that are corresponding to the first information and that are sent by the server. The second information herein may be the same as the first information, or may be different from the first information. A distribution policy may be preset by the server. A distribution policy corresponding to the first information is: distributing the N pieces of second information to a user when the first information is used.

Operation S103: Share the N pieces of second information to an information pool of the second user, so that contact users associated with the second user can view the N pieces of second information in the information pool.

In this embodiment of the present technology, the second user shares the N pieces of second information obtained by the second user to the information pool of the second user. Similarly, the contact users associated with the second user can view the N pieces of second information shared by the second user in the information pool. Next, the contact users associated with the second user can also use the second information, and then obtain other information for sharing and using again.

It can be seen that after first information is used, a server sends multiple pieces of second information to a second user according to a preset policy. The second user may share the multiple pieces of second information to an information pool, and the information in the information pool is exposed and reused among contact users of the second user, thereby forming splitting information sharing. In this way, friends can mutually use information in information pool, so that the asymmetry of information use is eliminated, the information spreading capacity is improved, and users, as many as possible, can share information with friends.

Figure 2:
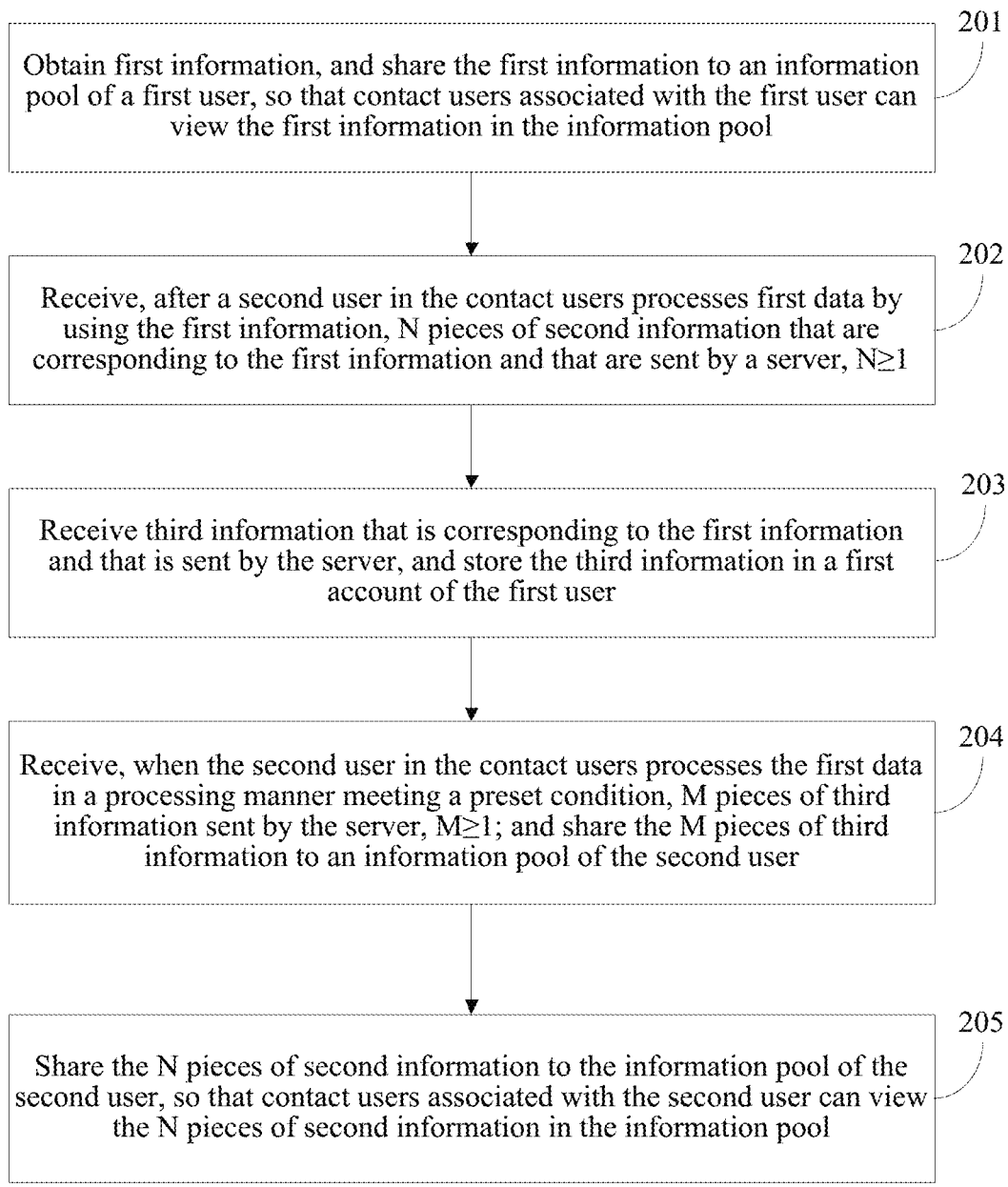
FIG. 2 is a schematic flowchart of an information sharing method according to some embodiments of the present technology.

FIG. 2 is a schematic flowchart of an information sharing method according to some embodiments of the present technology. The information sharing method in this embodiment of the present technology is applied to a client. As shown in FIG. 2, the information sharing method includes the following operations:

Operation S201: Obtain first information, and share the first information to an information pool of a first user, so that contact users associated with the first user can view the first information in the information pool.

In this embodiment of the present technology, the first information especially refers to an electronic ticket. In this embodiment of the present technology, the first information is also referred to as a card. The card is issued by a merchant on a card issue platform. The card issue platform herein is implemented by a server. The merchant may set a card collection condition. A user may collect the card after meeting the collection condition.

In this embodiment of the present technology, after obtaining the first information, the first user shares the first information to the information pool of the first user. The information pool of the first user herein stores multiple pieces of information, and each piece of information corresponds to a card. That is, the information pool of the first user stores cards of the first user. Particularly, the information in the information pool of the first user can be viewed not only by the first user, but also by the contact users associated with the first user. Therefore, the information pool of the first user is a shared information pool. During specific implementation, the information pool may be named "Offers from Friends", or may be named other names certainly.

In this embodiment of the present technology, the information pool may be implemented by combining an existing application. For example, WeChat has a function of "Cards & Offers", multiple cards are stored in the "Cards & Offers", the "Cards & Offers" may be named the "Offers from Friends", and all the cards in the "Cards & Offers" may be viewed by all the contact users of the first user.

Step S202: Receive, after a second user in the contact users processes first data by using the first information, N pieces of second information that are corresponding to the first information and that are sent by a server, N≥1.

The second user herein is different from the first user. The second user is one of the contacts of the first user. The contacts herein are also referred to as friends. That a second user processes first data by using the first information means that the second user uses the first information to pay for a target object to be paid. It can be seen that the first data is the target object to be paid. After the second user processes the first data by using the first information, the first information is redeemed. Being redeemed means that the first information is used. The used first information does not have a use function any more, that is, the user cannot process data again by using the used first information.

In this embodiment of the present technology, the server refers to a card distribution platform. After the second user processes the first data by using the first information, the second user receives the N pieces of second information that are corresponding to the first information and that are sent by the server. The second information herein may be the same as the first information, or may be different from the first information. A distribution policy may be preset by the server. A distribution policy corresponding to the first information is: distributing the N pieces of second information to a user when the first information is used.

Operation S203: Receive third information that is corresponding to the first information and that is sent by the server, and store the third information in a first account of the first user.

In this embodiment of the present technology, the third information especially refers to electronic cash. The server (merchant) presets a distribution policy of the third information. The distribution policy corresponding to the first information is: distributing the third information to a user issuing the first information when the first information is used.

In this embodiment of the present technology, the first user may preset the first account bound to the first user, and automatically store the third information in the bound first account when the server sends the third information to the first user. The first account herein may be a digital wallet or a bank card account.

Operation S204: Receive, when the second user in the contact users processes the first data in a processing manner meeting a preset condition, M pieces of third information sent by the server, M≥1, and share the M pieces of third information to an information pool of the second user.

In this embodiment of the present technology, the server may preset the processing manner, for example, a payment method. When the second user pays for a target object by using the preset payment method, the server distributes the M pieces of third information to the second user. During actual application, some payment methods are relatively convenient, for example, WeChat Pay. A merchant prefers more that the user uses the preset payment method to perform a payment operation. If the user uses the preset payment method, the merchant may give back more cards to the user.

In this embodiment of the present technology, the third information especially refers to a card. The third information may be information the same as the first information, or may be information different from the first information.

Operation S205: Share the N pieces of second information to the information pool of the second user, so that contact users associated with the second user can view the N pieces of second information in the information pool.

In this embodiment of the present technology, when viewing the N pieces of second information in the information pool, the contact users associated with the second user can also view the M pieces of third information in operation S204.

In this embodiment of the present technology, the second user shares the N pieces of second information obtained by the second user to the information pool of the second user. Similarly, the contact users associated with the second user can view the N pieces of second information shared by the second user in the information pool. Next, the contact users associated with the second user can also use the second information, and then obtain other information for sharing and using again.

It can be seen that after first information is used, a server sends multiple pieces of second information to a second user according to a preset policy. The second user may share the multiple pieces of second information to an information pool, and the information in the information pool is exposed and reused among contact users of the second user, thereby forming splitting information sharing. In this way, friends can mutually use information in information pool, so that the asymmetry of information use is eliminated, the information spreading capacity is improved, and users, as many as possible, can share information with friends.

Figure 3:
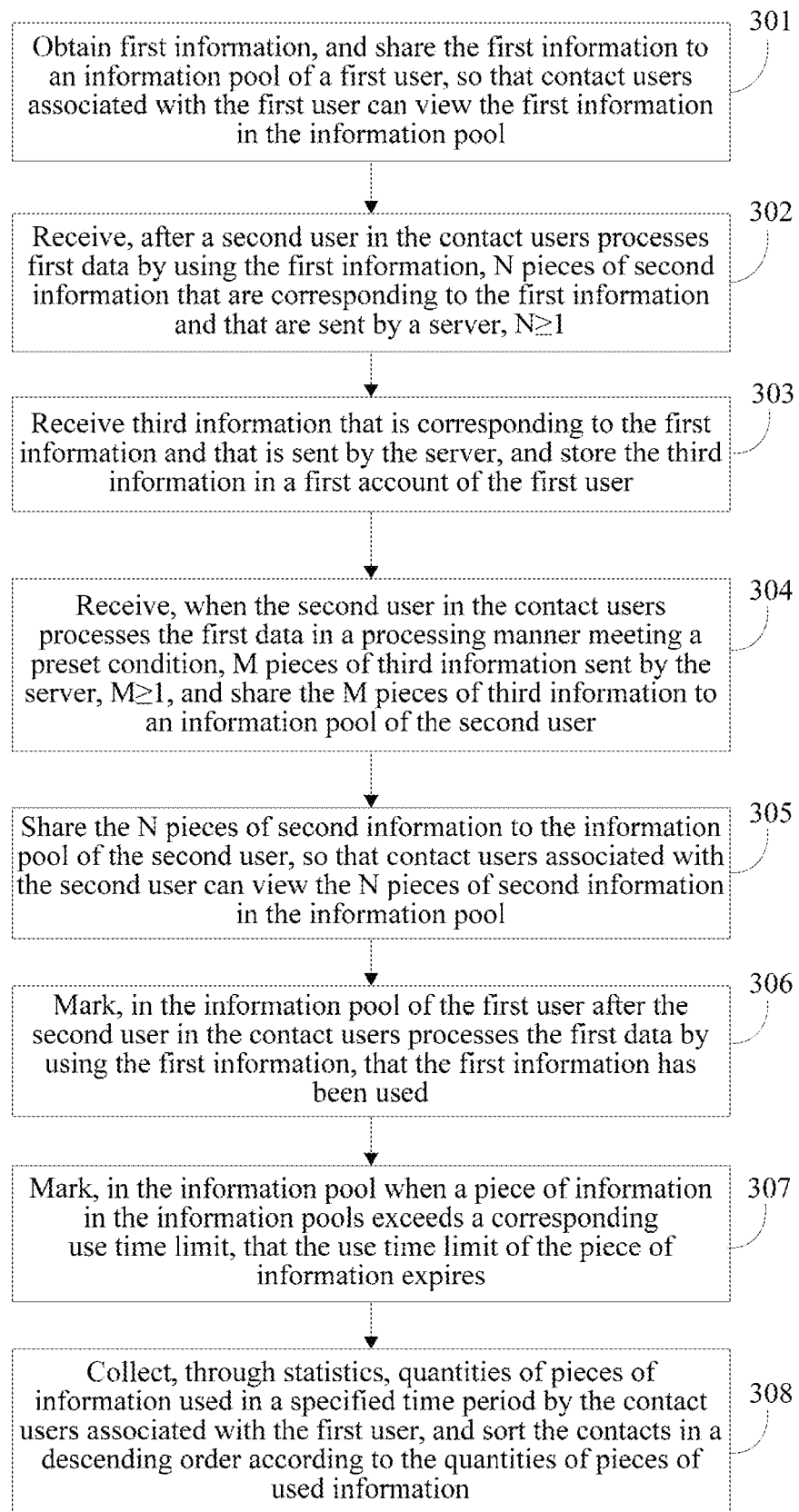
FIG. 3 is a schematic flowchart of an information sharing method according to some embodiments of the present technology.

FIG. 3 is a schematic flowchart of an information sharing method according to some embodiments of the present technology. The information sharing method in this embodiment of the present technology is applied to a client. As shown in FIG. 3, the information sharing method includes the following operations:

Operation S301: Obtain first information, and share the first information to an information pool of a first user, so that contact users associated with the first user can view the first information in the information pool.

In this embodiment of the present technology, the first information especially refers to an electronic ticket. In this embodiment of the present technology, the first information is also referred to as a card. The card is issued by a merchant on a card issue platform. The card issue platform herein is implemented by a server. The merchant may set a card collection condition. A user may collect the card after meeting the collection condition.

In this embodiment of the present technology, after obtaining the first information, the first user shares the first information to the information pool of the first user. The information pool of the first user herein stores multiple pieces of information, and each piece of information corresponds to a card. That is, the information pool of the first user stores cards of the first user. Particularly, the information in the information pool of the first user can be viewed not only by the first user, but also by the contact users associated with the first user. Therefore, the information pool of the first user is a shared information pool. During specific implementation, the information pool may be named "Offers from Friends", or may be named other names certainly.

In this embodiment of the present technology, the information pool may be implemented by combining an existing application. For example, WeChat has a function of "Cards & Offers", multiple cards are stored in the "Cards & Offers", the "Cards & Offers" may be named the "Offers from Friends", and all the cards in the "Cards & Offers" may be viewed by all the contact users of the first user.

Operation S302: Receive, after a second user in the contact users processes first data by using the first information, N pieces of second information that are corresponding to the first information and that are sent by a server, N≥1.

The second user herein is different from the first user. The second user is one of the contacts of the first user. The contacts herein are also referred to as friends. That a second user processes first data by using the first information means that the second user uses the first information to pay for a target object to be paid. It can be seen that the first data is the target object to be paid. After the second user processes the first data by using the first information, the first information is redeemed. Being redeemed means that the first information is used. The used first information does not have a use function any more, that is, the user cannot process data again by using the used first information.

In this embodiment of the present technology, the server refers to a card distribution platform. After the second user processes the first data by using the first information, the second user receives the N pieces of second information that are corresponding to the first information and that are sent by the server. The second information herein may be the same as the first information, or may be different from the first information. A distribution policy may be preset by the server. A distribution policy corresponding to the first information is: distributing the N pieces of second information to a user when the first information is used.

Operation S303: Receive third information that is corresponding to the first information and that is sent by the server, and store the third information in a first account of the first user.

In this embodiment of the present technology, the third information especially refers to electronic cash. The server (merchant) presets a distribution policy of the third information. The distribution policy corresponding to the first information is: distributing the third information to a user issuing the first information when the first information is used.

In this embodiment of the present technology, the first user may preset the first account bound to the first user, and automatically store the third information in the bound first account when the server sends the third information to the first user. The first account herein may be a digital wallet or a bank card account.

Operation S304: Receive, when the second user in the contact users processes the first data in a processing manner meeting a preset condition, M pieces of third information sent by the server, M≥1, and share the M pieces of third information to an information pool of the second user.

In this embodiment of the present technology, the server may preset the processing manner, for example, a payment method. When the second user pays for a target object by using the preset payment method, the server distributes the M pieces of third information to the second user. During actual application, some payment methods are relatively convenient, for example, WeChat Pay. A merchant prefers more that the user uses the preset payment method to perform a payment operation. If the user uses the preset payment method, the merchant may give back more cards to the user.

In this embodiment of the present technology, the third information especially refers to a card. The third information may be information the same as the first information, or may be information different from the first information.

Operation S305: Share the N pieces of second information to the information pool of the second user, so that contact users associated with the second user can view the N pieces of second information in the information pool.

In this embodiment of the present technology, when viewing the N pieces of second information in the information pool, the contact users associated with the second user can also view the M pieces of third information in operation S304.

In this embodiment of the present technology, the second user shares the N pieces of second information obtained by the second user to the information pool of the second user. Similarly, the contact users associated with the second user can view the N pieces of second information shared by the second user in the information pool. Next, the contact users associated with the second user can also use the second information, and then obtain other information for sharing and using again.

Operation S306: Mark, in the information pool of the first user after the second user in the contact users processes the first data by using the first information, that the first information has been used.

In this embodiment of the present technology, there may be multiple marking methods, for example, performing marking by using text information, or performing marking by using a background color. After seeing a mark, the user may quickly determine that the first information has been used.

Operation S307: Mark, in the information pool when a piece of information in the information pool exceeds a corresponding use time limit, that the use time limit of the piece of information expires.

In this embodiment, each piece of information in the information pool has a corresponding use time limit. A piece of information that exceeds the use time limit cannot be used. Therefore, it needs to be marked whether the use time limit of the piece of information expires.

Operation S308: Collect, through statistics, quantities of pieces of information used in a specified time period by the contact users associated with the first user, and sort the contacts in a descending order according to the quantities of pieces of used information.

In this embodiment of the present technology, for a user using a relatively large quantity of pieces of information, the server distributes a gift pack to the user. The gift pack may be a card, electronic cash, or the like. Therefore, the user is stimulated to use the card. After the card is redeemed, a splitting spreading of the card is further promoted, thereby forming splitting information sharing. In this way, friends can mutually use information in information pool, so that the asymmetry of information use is eliminated, the information spreading capacity is improved, and users, as many as possible, can share information with friends.

The information sharing method in this embodiment of the present technology is further described below with reference to a specific scenario.

Figure 4:
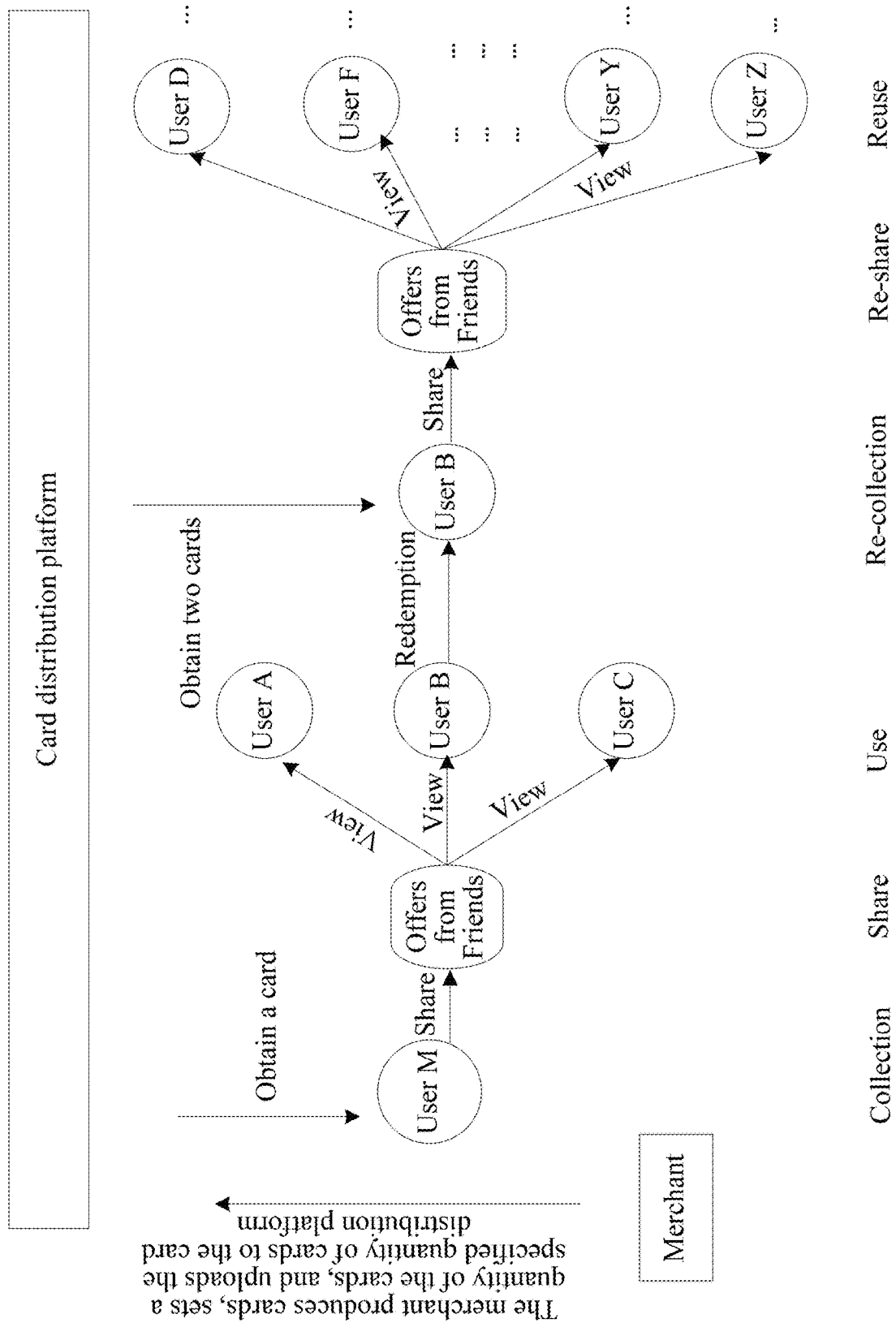
FIG. 4 is a schematic diagram of splitting sharing of a card (e.g., an electronic coupon) according to some embodiments of the present technology.

Referring to FIG. 4, a merchant first produces cards and sets a quantity of the cards, and then uploads the specified quantity of cards to a card distribution platform. Then, the merchant sets a rebate amount and distribution rules. The specified distribution rules are as follows.

1. After a card shared by a user M is redeemed by a user B, the user M obtains a cash rebate.

2. After a card shared by a user M is redeemed by a user B, the user B obtains two cards.

3. If a user B performs payment by means of WeChat Pay, the user B obtains three cards.

4. When a card shared by a user M is redeemed by a user B, the user B obtains five cards if performing payment by means of WeChat Pay.

After redeeming the card or performing payment by means of the WeChat Pay, the user M may obtain a card that can be shared. Then, the user M shares the card to "Offers from Friends". Contacts: a user A, the user B, and a user C, of the user M can use the card after viewing the card in the "Offers from Friends".

After redeeming the card from the merchant, the user B obtains two cards. Then, the user B shares the two cards to the "Offers from Friends". Contacts: a user D, a user F, a user Y, and a user Z, of the user B can use the cards after viewing the cards in the "Offers from Friends".

After the foregoing process is performed, the card is spread and used in a splitting manner, thereby greatly improving the use efficiency and spreading efficiency of the card.

Figure 5:
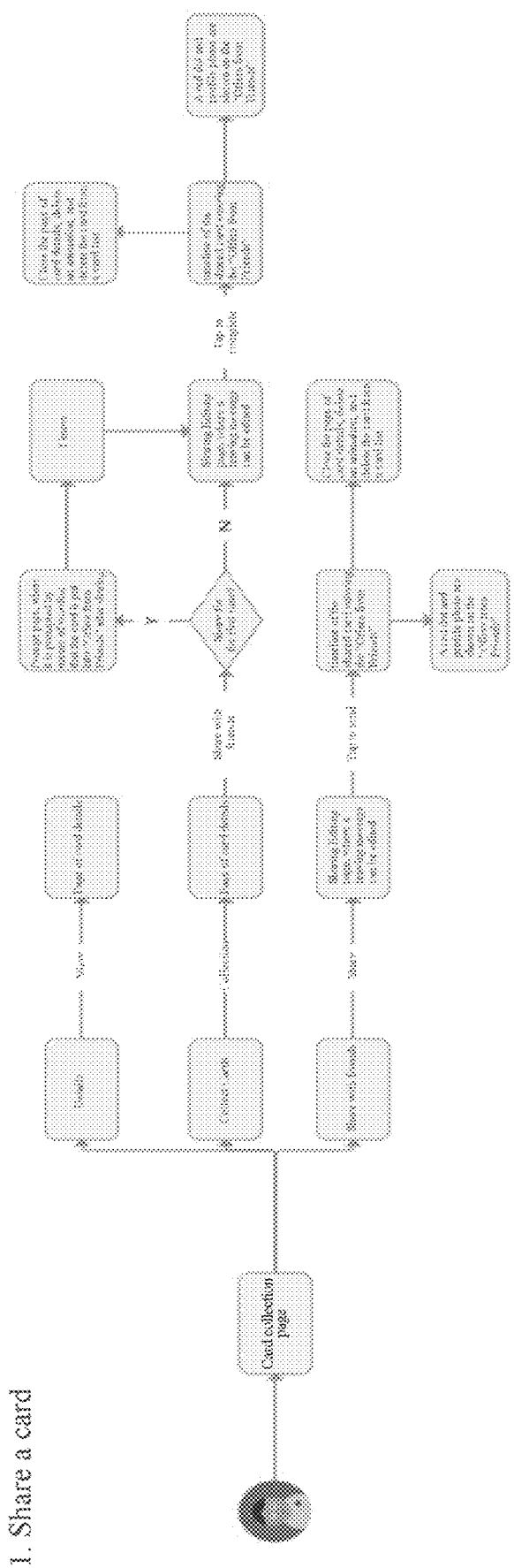
FIG. 5 is a schematic diagram of sharing processing of a card (e.g., an electronic coupon) according to some embodiments of the present technology.
Figure 5:
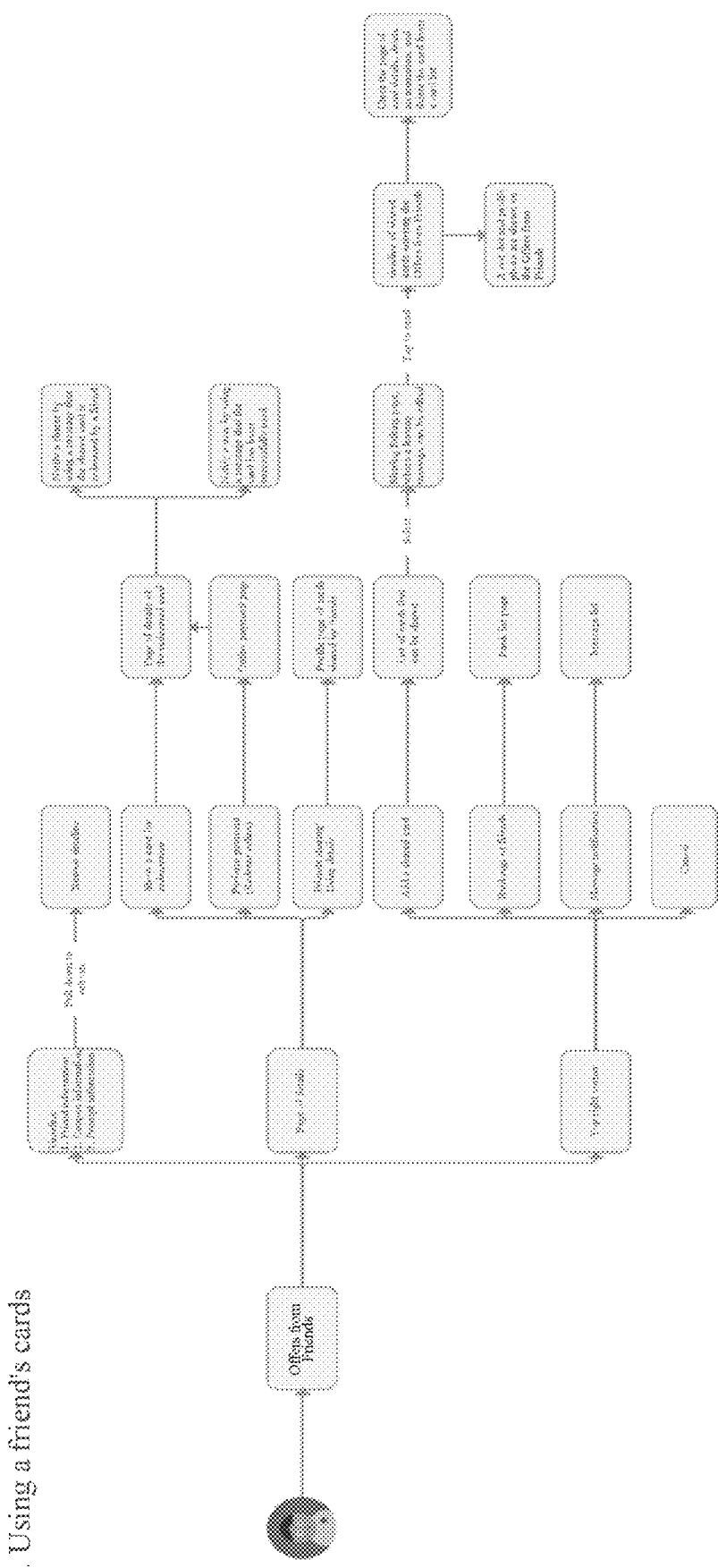
Figure 5:
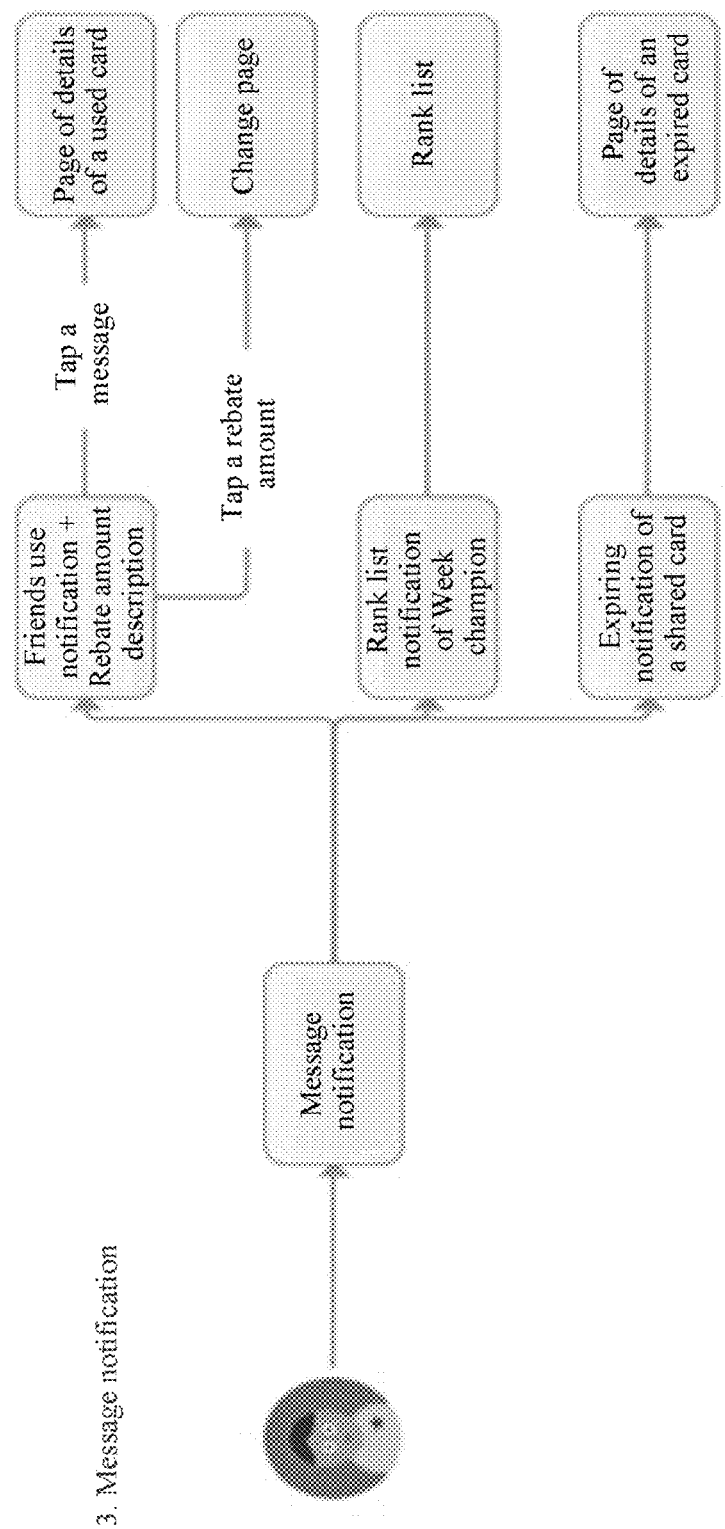
Figure 5:
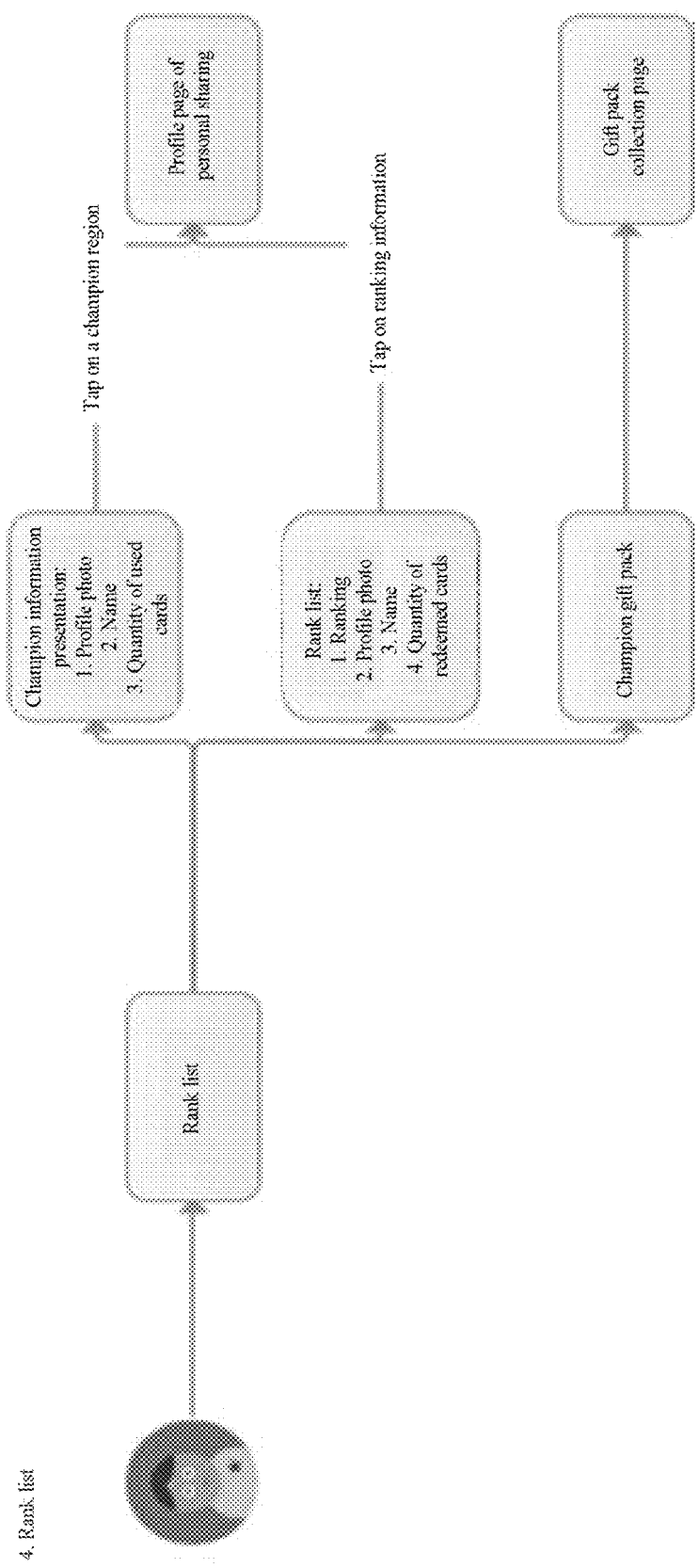

The application of the card in this embodiment of the present technology is described in detail below in four aspects with reference to FIG. 5.

1. Sharing a Card

First, a user enters a card collection page. The card collection page is divided into three blocks which are respectively "Details", "Collect Cards", and "Share with Friends".

When entering the "Details", the user may view a page of card details.

When entering the "Collect Cards", the user may collect a card and enter the page of card details. Then, the user shares the collected card with friends. When sharing the card for the first time, the user is prompted by using a text to save the card to "Offers from Friends". Then, the user may edit a leaving message of the card on a sharing editing page. After the card is shared, the card enters the "Offers from Friends". Later, the page of card details is closed, and the collected card on the page of card details is deleted from a card list. After the card is shared, a red dot and a profile photo are shown on the "Offers from Friends" to notify a user which user has shared a new card.

When entering the "Share with Friends", the user may edit the leaving message of the card on the sharing editing page. After the card is shared, the card enters the "Offers from Friends". Later, the page of card details is closed, and the collected card on the page of card details is deleted from the card list. After the card is shared, a red dot and a profile photo are shown on the "Offers from Friends" to notify a user which user has shared a new card.

2. Using a Friend'S Card

A user enters "Offers from Friends", and the following types of information: friend information, coupon information, and prompt information are listed in the "Offers from Friends". The user may refresh the information by pulling down the "Offers from Friends" page.

After entering a page of details of a card, the user may directly show the card to a merchant to redeem the card, or may perform payment online to redeem the card. After the card is redeemed, the page of details of the redeemed card is prompted. Then, a message is sent to a sharer to notify that the shared card has been redeemed by a friend, and a message is sent to the card user to notify that the card has been successfully used. The user may further view, on the page of details, details of the card shared/used by the friend.

The user may add a shared card at the top right corner of the "Offers from Friends" page. Then, a list of cards that can be shared pops up. After selecting a card, the user edits a leaving message of the card on the sharing editing page. After the card is shared, the card enters the "Offers from Friends". Later, the page of card details is closed, and the collected card on the page of card details is deleted from the card list. After the card is shared, a red dot and a profile photo are shown on the "Offers from Friends" to notify a user which user has shared a new card. In addition, blocks such as "Friends Ranking", "Message Notification", and "Cancel" are further set at the top right corner of the "Offers from Friends" page, thereby facilitating the user to view the ranking of quantities of cards used by the friends, view the messages, and so on.

3. Message Notification

After entering the "Message Notification", a user may obtain the following messages: a notification message that a friend uses a card of the user, a cash rebate message, a message of a rank list of card use, and a notification message that a card expires.

4. Rank List

After a user enters the "Rank List", a rank list of quantities of the used cards may be displayed. The rank list displays rankings, profile photos, names, and redemption quantities of users. The user may view information of a champion on the rank list. The champion user may collect a champion gift pack, so that the users are stimulated to increase the quantities of the used cards.

Based on the above, in some embodiments, an information sharing method, comprising: at a first client terminal associated with a first user account: obtaining first information for the first user account, wherein the first information corresponds to a first electronic coupon for a first good or service; receiving an instruction for sharing the first information to a first information pool of the first user, wherein the first information pool includes a plurality of electronic coupons shared by one or more contact users associated with the first user, and wherein the first information pool is accessible to respective user accounts of the one or more contact users; in response to receiving the instruction, adding the first electronic coupon to the first information pool; receiving a confirmation notification from a third-party server corresponding to the first electronic coupon, wherein the confirmation notification is sent by the third-party server in response to a second user in the contact users applying the first electronic coupon in an online transaction, wherein the confirmation notification includes at least second information that corresponds to the first information, wherein the second information includes a second electronic coupon related to the first electronic coupon; and processing the confirmation notification to obtain a notification and the second electronic coupon, including: displaying, in a notification listing, a first notification including description of the transaction; and displaying, in a coupon listing, the second electronic coupon.

In some embodiments, displaying, in the coupon listing, the second electronic coupon comprises: while displaying the second electronic coupon: displaying a first option for saving the second electronic coupon in a private information pool, wherein the private information pool includes one or more electronic coupons that are not shared with other contact users of the first user; and displaying a second option for saving the second electronic coupon in the first information pool. In some embodiments, the method further include: receiving a user input selecting the option for saving the second electronic coupon in the first information pool; and in response to receiving the user input selecting the option for saving the second electronic coupon in the first information pool: adding the second electronic coupon to the first information pool for access by the contact users of the first user; and requesting a reward from the third-party server in associating with adding the second electronic coupon to the first information pool. In some embodiments, in response to receiving the user input selecting the option for saving the second electronic coupon in the first information pool: the client device automatically sends a group message for the contact users of the first user describing the second electronic coupon.

In some embodiments, the method includes: generating a request for at least one additional electronic coupon related to the first electronic coupon, wherein the request includes a respective identifier of the confirmation notification, wherein the request causes the third-party server to add one or more additional electronic coupons to the first information pool without further input from the first user.

In some embodiments, adding the first electronic coupon to the first information pool includes: scanning restrictions associated with the first electronic coupon for geographic restrictions on the first electronic coupon; and in response to detecting a first geographic restriction on the first electronic coupon: scanning geographic locations of the contact users of the first user to identify a subset of the contact users that are located in regions where usage of the first electronic coupon is restricted; and including an indicator with the first electronic coupon when adding the first electronic coupon to the first information pool, wherein the indicator causes a server maintaining the first information pool to prevent the first electronic coupon from being displayed to or made accessible to the subset of contact users of the first user.

In some embodiments, when displaying the plurality of electronic coupons in the first information pool, scanning restrictions associated with the first electronic coupon for geographic restrictions on the first electronic coupon; and in response to detecting a first geographic restriction on the first electronic coupon: determining current geographic location of the first user to determine whether usage of the first electronic coupon is restricted at the current geographic location of the first user; in accordance with a determination that the first geographic restriction prohibits usage of the first electronic coupon at the current geographic location of the first user, preventing the first electronic coupon from being displayed to or made accessible to the first user while the first user remains at the first geographic location; and redisplay the first electronic coupon in the first information pool in response to detecting that the first user has exited the first geographic location.

In some embodiments, the method further includes: displaying the plurality of electronic coupons in the first information pool in a group coupon listing interface, wherein the group coupon listing interface indicates a coupon split option for splitting a respective electronic coupon with one or more contact users of the first user. For example, in some embodiments, a user intending to use a respective coupon can place a bid on the coupon, and the bid is displayed next to the coupon. When another user intending to use the coupon adds a different bid that is higher than the previous bid, the user's bid is displayed replacing the earlier bid. When a predefined amount of time has passed (e.g., two minutes), the highest bid wins and the winning user can apply the coupon in a transaction. The client terminal tracks the highest bid for each coupon and automatically suggests a bid for the user when the user selects to view a coupon that already has a bid on it. In some embodiments, the coupon allows multiple users to use in different transactions, and the coupon value changes depending on the number of people in the shared coupon pool that have signed up to use it. In some embodiments, in order to sign up to use a coupon, the user selects a split coupon option next to the coupon, and the user's identifier is added to a list of splitting users. When a predefined time period expires since the first splitting user has signed up for the coupon use, the coupon value is determined by the server, and the coupon value is credited to the users that have signed up to use the coupon in transactions. In some embodiments, the coupon splitting is valid for transactions that occur at different time points and locations, as long as predefined expiration period is observed by the coupon splitters for the coupon.

In some embodiments, the social networking application includes a card and coupons interface and during online transactions, the user can select the affordance for the cards and coupons interface and cause the cards and coupons interface to be displayed. After selecting a coupon and apply the coupon for the online transaction, the sever of the online transaction pushes a notification to the client terminal, where the pushed notification includes both a confirmation of the transaction and summary of the transaction, but also information for recommending a second coupon for the same or a related service or goods. The pushed notification is parsed by the client terminal and the information regarding the transaction is displayed in a listing of notifications in the social network application notification interface, and the information regarding the second coupon is presented in a coupon listing interface, e.g., together with other coupons that are already saved by the user, and optionally with other coupons that are recommended as a result of other transactions that occurred on the user device. In some embodiments, the user when looking at the listing of coupons and cards in the coupons and cards interface, can click on one of the recommended coupons to view details of the coupon or claim and save the coupon to the listing of coupons that can be directly applied in transactions. The notification information conventionally only includes transaction confirmation and summary information, and the whole notification content is displayed to the user as a notification (e.g., in a notification banner). As disclosed herein, the notification information received from the third-party server is parsed by the client terminal, and some of the information is displayed in a first notification banner in a notification listing, and some of the information is displayed in a second banner in a coupon listing user interface. In some embodiments, the parsing is performed by the social network server, and the single notification information is pushed to the client terminal as two separate notifications which are displayed by the client terminal in two different listings (e.g., notification listing, and coupon and cards listing).

In some embodiments, the client terminal allows the user to select and forward/share the coupon or card (or other usage credentials) via an instant message to a social network contact. In some embodiments, in response to receiving a user's input to select and forward a coupon or other usage credential, the client terminal duplicates the usage credential and sends it to the social network contact via a messaging channel of the social network platform. In some embodiments, the coupon or usage credential is transferred to the social network contact and the coupon or usage credential is deleted from the user's device. In some embodiments, when the social network contact applies the coupon or usage credential in an online transaction later, a reward coupon is sent by the third party backend server of the service to the user as a reward. In some embodiments, the unclaimed coupons and cards a listed before the claimed coupons and cards in the coupon and cards listing user interface to indicate that attention is still required from the user; in other words, the unclaimed coupon still carries the notification property of the original notification information and requires a user input to be cleared from the device. In some embodiments, the notification for the transaction is cleared from the notification listing in response to user viewing or automatic clearing, while the coupon carried in the notification information still remains in the coupon and cards listing user interface. In some embodiments, the coupon portion and the transaction conformation portions of the notification information are cleared independently of each other by system rules and user inputs.

Other details of the method is provided with respect to other parts of the present disclosure, and can be combined with the above method without limitation except where explicitly stated.

Figure 6:
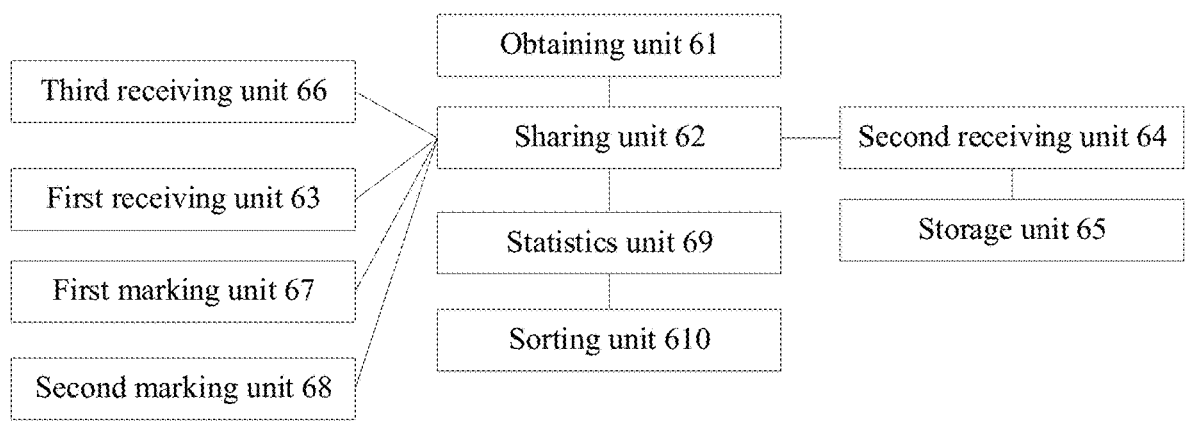
FIG. 6 is a schematic structural composition diagram of a client according to some embodiments of the present technology.

FIG. 6 is a schematic structural composition diagram of a client according to an embodiment of the present technology. As shown in FIG. 6, the client includes:

an obtaining unit 61, configured to obtain first information;

a sharing unit 62, configured to share the first information to an information pool of a first user, so that contact users associated with the first user can view the first information in the information pool;

a first receiving unit 63, configured to receive, after a second user in the contact users processes first data by using the first information, N pieces of second information that are corresponding to the first information and that are sent by a server, N≥1, the sharing unit 62 being further configured to share the N pieces of second information to an information pool of the second user, so that contact users associated with the second user can view the N pieces of second information in the information pool.

In this embodiment of the present technology, the client further includes:

a second receiving unit 64, configured to receive third information that is corresponding to the first information and that is sent by the server; and a storage unit 65, configured to store the third information in a first account of the first user.

In this embodiment of the present technology, the client further includes:

a third receiving unit 66, configured to receive, when the second user in the contact users processes the first data in a processing manner meeting a preset condition, M pieces of third information sent by the server, M≥1, where the sharing unit 62 is further configured to share the M pieces of third information to the information pool of the second user.

In this embodiment of the present technology, the client further includes:

a first marking unit 67, configured to mark, in the information pool of the first user after the second user in the contact users processes the first data by using the first information, that the first information has been used.

In this embodiment, each piece of information in the information pool has a corresponding use time limit; and the client further includes:

a second marking unit 68, configured to mark, in the information pool when a piece of information in the information pool exceeds a corresponding use time limit, that the use time limit of the piece of information expires.

In this embodiment of the present technology, the client further includes:

a statistics unit 69, configured to obtain, through statistics, quantities of pieces of information used in a specified time period by the contact users associated with the first user; and a sorting unit 610, configured to sort the contacts in a descending order according to the quantities of pieces of used information.

Persons skilled in the art should understand that the implementation functions of the units in the client shown in FIG. 6 may be understood with reference to the related descriptions of the foregoing information sharing method. The functions of the units in the client shown in FIG. 6 may be implemented by using programs running in the processor, or may be implemented by using a specific logic circuit.

If the integrated module in this embodiment of the present technology is implemented in the form of a software functional module and sold or used as an independent product, the integrated module may also be stored in a computer-readable storage medium. People skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer-usable storage media including computer-usable program code. The storage media include, but are not limited to, a USB flash drive, a removable hard disk, a read-only memory (ROM), a random access memory (RAM), a magnetic disk memory, a CD-ROM, an optical memory, and the like.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although some preferred embodiments of the present technology have been described, persons skilled in the art can make changes and modifications to these embodiments once they learn the basic inventive concept. Therefore, the following claims are intended to be construed as to cover the preferred embodiments and all changes and modifications falling within the scope of this application.

Correspondingly, an embodiment of the present technology further provides a computer storage medium storing a computer program, and the computer program is used for performing the foregoing information sharing method of the embodiments of the present technology.

The technical solutions of the embodiments of the present technology may be arbitrarily combined with each other as long as there is no contradiction.

In the several embodiments provided in the present disclosure, it should be understood that the disclosed method and intelligent device may be implemented in other manners. The described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The foregoing units described as separate parts may be, or may not be physically separated. The parts displayed as units may be, or may not be physical units, may be located in one position, or may be distributed on multiple network units. Some or all of the units may be selected according to actual needs to achieve the objectives of the solutions of the embodiments.

In addition, the functional units in the embodiments of the present technology may be integrated into a second processing unit, or each of the units may serve as a unit alone, or two or more units may be integrated into one unit. The integrated unit may be implemented in the form of hardware, or may be implemented in the form of combining hardware and a software functional unit.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure.

What is claimed is:

1. An information sharing method performed at a first client terminal and a remote server, wherein the first client terminal is communicatively connected to the remote server that hosts a social networking application, the method comprising:
    at the first client terminal associated with a first user account of the social networking application:
        obtaining, from the remote server, first information for the first user account, wherein the first information corresponds to a first electronic coupon for a first good or service;
        receiving, from the first user, an instruction for sharing the first information to a first information pool of the first user, wherein the first information pool includes a plurality of electronic coupons shared with one or more contact users at the social networking application and associated with the first user, and wherein the first information pool is accessible to respective user accounts of the one or more contact users;
        in response to receiving the instruction, adding the first electronic coupon to the first information pool, including:
            determining a first geographic restriction corresponding to the first electronic coupon;
            scanning geographic locations of the one or more contact users to identify a subset of the one or more contact users that are located in regions where usage of the first electronic coupon is disabled according to the first geographic restriction; and
            including an indicator adjacent the first electronic coupon when adding the first electronic coupon to the first information pool, wherein the indicator causes a server maintaining the first information pool to prevent the first electronic coupon from being displayed to or made accessible to the subset of the one or more contact users of the first user;
        receiving a confirmation notification from a third-party server corresponding to the first electronic coupon, wherein the confirmation notification is sent by the third-party server in response to a second user in the one or more contact users of the first user and associated with a second client terminal applying the first electronic coupon in an online transaction, wherein the confirmation notification includes at least second information that corresponds to the first information, wherein the second information includes a second electronic coupon related to the first electronic coupon and a plurality of third electronic coupons issued by the third-party server, and wherein the second user applying the first electronic coupon in the online transaction causes the plurality of third electronic coupons to be added without user input to a second information pool of a second user account of the social networking application associated with the second client terminal, where the second information pool is to be shared with one or more contact users at the social networking application and associated with the second user;
        marking the first electronic coupon in the first information pool associated with the first user account of the social networking application in a visually distinctive manner to indicate that the first electronic coupon has been used;
        processing the confirmation notification to obtain a notification and the second electronic coupon, including:
            displaying, in a notification listing, a first notification including description of the transaction; and
            displaying, in a coupon listing, the second electronic coupon, wherein the coupon listing is a private information pool including one or more electronic coupons that are not shared with other contact users of the first user.

2. The method of claim 1, including:
generating a request for at least one additional electronic coupon related to the first electronic coupon, wherein the request includes a respective identifier of the confirmation notification, wherein the request causes the third-party server to add one or more additional electronic coupons to the first information pool without further input from the first user.

3. The method of claim 1, including:
displaying the plurality of electronic coupons in the first information pool in a group coupon listing interface, wherein the group coupon listing interface indicates a coupon split option for splitting a respective electronic coupon with one or more contact users of the first user.

4. A computer network system comprising: a first client terminal and a remote server, wherein the first client terminal is communicatively connected to the remote server that hosts a social networking application, each of the first client terminal and the remote server comprising:

one or more processors; and memory storing instructions, which when executed by the one or more processors, cause the processors to perform operations comprising:

at the first client terminal associated with a first user account of the social networking application:

obtaining, from the remote server, first information for the first user account, wherein the first information corresponds to a first electronic coupon for a first good or service;

receiving, from the first user, an instruction for sharing the first information to a first information pool of the first user, wherein the first information pool includes a plurality of electronic coupons shared with one or more contact users at the social networking application and associated with the first user, and wherein the first information pool is accessible to respective user accounts of the one or more contact users;

in response to receiving the instruction, adding the first electronic coupon to the first information pool, including:

determining a first geographic restriction corresponding to the first electronic coupon;

scanning geographic locations of the one or more contact users to identify a subset of the one or more contact users that are located in regions where usage of the first electronic coupon is disabled according to the first geographic restriction; and including an indicator adjacent the first electronic coupon when adding the first electronic coupon to the first information pool, wherein the indicator causes a server maintaining the first information pool to prevent the first electronic coupon from being displayed to or made accessible to the subset of the one or more contact users of the first user;

receiving a confirmation notification from a third-party server corresponding to the first electronic coupon, wherein the confirmation notification is sent by the third-party server in response to a second user in the one or more contact users of the first user and associated with a second client terminal applying the first electronic coupon in an online transaction, wherein the confirmation notification includes at least second information that corresponds to the first information, wherein the second information includes a second electronic coupon related to the first electronic coupon and a plurality of third electronic coupons issued by the third-party server, and wherein the second user applying the first electronic coupon in the online transaction causes the plurality of third electronic coupons to be added without user input to a second information pool of a second user account of the social networking application associated with the second client terminal, where the second information pool is to be shared with one or more contact users at the social networking application and associated with the second user;

marking the first electronic coupon in the first information pool associated with the first user account of the social networking application in a visually distinctive manner to indicate that the first electronic coupon has been used;

processing the confirmation notification to obtain a notification and the second electronic coupon, including:

displaying, in a notification listing, a first notification including description of the transaction; and displaying, in a coupon listing, the second electronic coupon, wherein the coupon listing is a private information pool including one or more electronic coupons that are not shared with other contact users of the first user.

5. The computer network system of claim 4, wherein the operations include:

generating a request for at least one additional electronic coupon related to the first electronic coupon, wherein the request includes a respective identifier of the confirmation notification, wherein the request causes the third-party server to add one or more additional electronic coupons to the first information pool without further input from the first user.

6. The computer network system of claim 4, wherein the operations include:

displaying the plurality of electronic coupons in the first information pool in a group coupon listing interface, wherein the group coupon listing interface indicates a coupon split option for splitting a respective electronic coupon with one or more contact users of the first user.

7. A non-transitory computer-readable storage medium storing instructions, the instructions, when executed by a computer network system comprising a first client terminal and a remote server, wherein the first client terminal is communicatively connected to the remote server that hosts a social networking application, each of the first client terminal and the remote server comprising one or more processors, cause the processors to perform operations comprising:

at the first client terminal associated with a first user account of the social networking application:

obtaining, from the remote server, first information for the first user account, wherein the first information corresponds to a first electronic coupon for a first good or service;

receiving, from the first user, an instruction for sharing the first information to a first information pool of the first user, wherein the first information pool includes a plurality of electronic coupons shared with one or more contact users at the social networking application and associated with the first user, and wherein the first information pool is accessible to respective user accounts of the one or more contact users;

in response to receiving the instruction, adding the first electronic coupon to the first information pool, including:

determining a first geographic restriction corresponding to the first electronic coupon;

scanning geographic locations of the one or more contact users to identify a subset of the one or more contact users that are located in regions where usage of the first electronic coupon is disabled according to the first geographic restriction; and including an indicator adjacent the first electronic coupon when adding the first electronic coupon to the first information pool, wherein the indicator causes a server maintaining the first information pool to prevent the first electronic coupon from being displayed to or made accessible to the subset of the one or more contact users of the first user;

receiving a confirmation notification from a third-party server corresponding to the first electronic coupon, wherein the confirmation notification is sent by the third-party server in response to a second user in the one or more contact users of the first user and associated with a second client terminal applying the first electronic coupon in an online transaction, wherein the confirmation notification includes at least second information that corresponds to the first information, wherein the second information includes a second electronic coupon related to the first electronic coupon and a plurality of third electronic coupons issued by the third-party server, and wherein the second user applying the first electronic coupon in the online transaction causes the plurality of third electronic coupons to be added without user input to a second information pool of a second user account of the social networking application associated with the second client terminal, where the second information pool is to be shared with one or more contact users at the social networking application and associated with the second user;

marking the first electronic coupon in the first information pool associated with the first user account of the social networking application in a visually distinctive manner to indicate that the first electronic coupon has been used;

processing the confirmation notification to obtain a notification and the second electronic coupon, including:
  displaying, in a notification listing, a first notification including description of the transaction; and
  displaying, in a coupon listing, the second electronic coupon, wherein the coupon listing is a private information pool including one or more electronic coupons that are not shared with other contact users of the first user.

8. The computer-readable storage medium of claim 7, wherein the operations include:
generating a request for at least one additional electronic coupon related to the first electronic coupon, wherein the request includes a respective identifier of the confirmation notification, wherein the request causes the third-party server to add one or more additional electronic coupons to the first information pool without further input from the first user.

* * * * *